UNITED STATES PATENT OFFICE 2,445,652

DERIVATIVES OF POLYMERIC ALLYL-TYPE ALCOHOLS

Richard R. Whetstone, Berkeley, Calif., assignor to Shell Development Company, San Francisco, Calif., a corporation of Delaware No Drawing. Application October 11, 1944,
Serial No. 558,285

4 Claims. (Cl. 260—465.6)

This invention relates to beta-cyanoethyl ethers of polymeric allyl-type alcohols, to derivatives thereof and to methods for their production.

The production of beta-cyanoethyl ethers of cellulose, polyvinyl alcohols and the like by the reaction of the alcoholic compounds with acrylonitrile is known. The cyano groups of the ethers may be converted to acid and other related groups, and if desired. These beta-cyanoethyl ethers and their derivatives are of such a nature as to be of theoretical value as plasticizers and like modifying agents for plastics and synthetic rubbers. They suffer, however, from the serious drawback that in general they are themselves relatively tough, rubbery substances which are difficult to handle and to bring into satisfactory admixture with many high polymers.

We have now discovered that improved beta-cyanoethyl ethers can be produced by the reaction of acrylonitrile with polymeric allyl-type alcohols, rather than with cellulose, polyvinyl alcohols or the like. These new beta-cyanoethyl ethers of polymeric allyl-type alcohols and the derivatives of these ethers such as the acids are characterized by unexpectedly superior handling properties and are compatible with even some of the more difficultly plasticized synthetic resins and rubbers. The new compounds are valuable for many other purposes and can be converted into other derivatives having unique properties, as will be more fully apparent from the description of the invention given hereinafter.

The new beta-cyanoethyl ethers can be produced by reacting acrylonitrile with a polymeric allyl-type alcohol.

Polymeric allyl-type alcohols are polymers of allyl-type alcohols, which are alcohols having a double bond of aliphatic character between two carbon atoms, one of which is attached directly to a saturated carbon atom, which in turn is attached directly to an alcoholic hydroxyl group as represented by the general structural formula

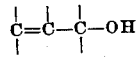

Alcohols embodying this structure may properly be termed "beta, gamma-olefinic monohydric alcohols."

Preferred allyl-type alcohols have a terminal methylene group attached by an olefinic double bond to a carbon atom which is attached directly to a saturated carbinol carbon atom, as represented by the formula

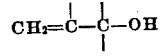

The alcohols falling within this preferred class are otherwise identified as beta, gamma-monoolefinic monohydric alcohols having a terminal methylene group.

Allyl-type alcohols useful in the present invention preferably have not more than about eighteen carbon atoms and have at least one unsaturated carbon-to-carbon linkage for each six carbon atoms.

Representative examples of preferred allyl-type alcohols, which are all properly identified as beta, gamma-olefinic alcohols, are the following: allyl alcohol, methallyl alcohol, ethallyl alcohol, chloroallyl alcohol, buten-1-ol-3, penten-1-ol-3, hexene-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hep-penten-1-ol-3, 4-methyl-hexen-1-ol-3, 5-methyl-ten-1-ol-3, 4,4'-dimethyl-penten-1-ol-3, octen-hexen-1-ol-3, 4,4'-dimethyl-penten-1-ol-3, octen-1-ol-3, 6-methyl-hepten-1-ol-3, 4-methyl-hep-ten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-buten-1-ol-3, 4-chloro-buten-1-ol-3, pentadien-propen-1-ol-3, hexen-1-yn-5-ol-3, 2-methyl-penten-1-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octa-dien-2,7-ol-1, cyclopenten-2-ol-1, cyclohexen-2-ol-1, etc. Allyl alcohol is preferred.

Polymeric allyl-type alcohols can be produced by polymerizing the monomeric alcohol by heating in the presence of oxygen or an oxygen-yielding polymerization catalyst, such as benzoyl peroxide, hydrogen peroxide, barium peroxide, etc. In the resulting polymers the molecules consist of monomer units joined principally by carbon-to-carbon linkages, although a minor proportion of the monomer units may be joined by ethereal oxygen atoms. The majority of functional groups in the polymer so produced are hydroxy groups, although acid and/or unsaturated aldehyde groups may be present.

More nearly theoretical polymeric allyl-type alcohols can be produced from the corresponding polymeric esters, acetals, or other suitable derivatives. The polymeric esters can be produced by the polymerization of the monomers. Preferred allyl-type esters are those of carboxylic acids devoid of a polymerizable unsaturated group, i. e. saturated aliphatic, including alicyclic, aromatic, etc., carboxylic acids. Representative examples of suitable allyl-type esters are allyl formate, allyl acetate, allyl propionate, allyl butyrate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl acetate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl levulinate, beta-methylallyl butyrate, alpha-methylallyl acetate, alpha-phenylallyl acetate, allyl ethoxyformate, beta-methylallyl phenoxyformate, allyl naphthoate, allyl esters of hydrogenated abietic acid, diallyl malonate, diallyl succinate, diallyl adipate, diallyl phthalate, and the like.

Polymeric allyl-type alcohols can be produced from organo-soluble polymers of allyl-type esters of unsaturated acids, such as acrylic, methacrylic, maleic, etc., acids. Allyl-type esters of ethereal oxygen-containing carboxylic acids may be used, such as diallyl diglycolate, diallyl dilactate, diallyl dihydracrylate, dimethallyl diglycolate, dicrotyl dilactate, dipropargyl diglycolate, etc. Others are the allyl-type esters of inorganic acids, notably of the ortho acids of boron, silicon and the like.

The alcohols can be formed by hydrolysis or alcoholysis of the ester polymers, the latter preferably under alkaline conditions.

Polymeric allyl-type alcohols produced from the polymeric esters generally have an average polymerization degree of between about 6 and about 12, although higher and lower polymers can be produced. The alcohols may have an average polymerization degree of 20 or more.

Instead of using completely hydrolyzed polymeric allyl-type alcohols in which the functional groups present in the side chains of the molecules are all hydroxyl groups, partially hydrolyzed polymeric allyl-type esters which have both alcoholic hydroxyl groups and ester groups in the molecule or other derivatives of partial polymeric allyl-type alcohols which may contain, in addition to alcoholic hydroxyl groups, acetal, ether, halide or other functional groups may be used.

Instead of homopolymers of allyl-type alcohol there may be employed copolymers of allyl-type alcohols which may be obtained by copolymerizing an allyl-type alcohol with another polymerizable unsaturated organic compound or by copolymerizing an ester-forming allyl-type alcohol derivative with such other compounds and subsequently converting some or all of the functional groups of the copolymerized allyl-type alcohol derivative to alcoholic hydroxyl groups.

Dimeric and trimeric allyl-type alcohols may be produced by heating an allyl-type halide in the presence of an alkali metal salt of carbonic acid and converting the resulting dimeric or trimeric allyl-type halide to the alcohol by hydrolyzing with an aqueous alcoholic solution of an alkali metal hydroxide or the like.

Polymeric allyl-type alcohols have in the molecule a plurality of groups of the general formula

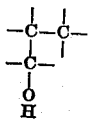

Polymeric allyl alcohols have a plurality of groups of the formula

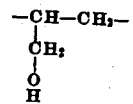

If desired, there may be present in the reaction mixture in the production of the beta-cyanoethyl ethers, in addition to homopolymers and copolymers of polymeric allyl-type alcohols, one or more other polyhydric alcohols such as polysaccharides, polyvinyl alcohols, cellulose, etc., any or all of which may or may not have in the molecule other functional groups such as ester, acetal, etc., groups in addition to alcoholic hydroxyl groups.

Instead of from the polymeric alcohols, the beta-cyanoethyl ethers may be produced from derivatives thereof capable of suitably reacting with acrylonitrile.

The reaction of the polymeric allyl-type alcohol or suitable derivative thereof with acrylonitrile is catalyzed by the presence of a base. Preferred catalysts are alkali metal hydroxides such as sodium hydroxide, potassium hydroxide, etc. Other water-soluble alkalies which may be employed include alkaline earth metal hydroxides, e. g. barium hydroxide, quaternary ammonium bases, alkali metal cyanides, carbonates, acetates and other alkali salts of weak acids.

The amount of alkali utilized as a catalyst depends in part upon the rapidity of the reaction desired. Amounts varying between about 0.01% and about 10% of the total amount of polyhydric compounds initially present in the reaction mixture may be employed, although the more narrow range of from about 1% to about 5% is preferred.

There is preferably present an amount of water sufficient to maintain the catalyst in solution. Thus, the alkali may be added in dilute or concentrated aqueous solution depending upon the degree of catalytic activity desired. For example, solutions containing 0.5% to about 20% by weight of an alkali metal hydroxide may be suitable. Amounts of water sufficient to dissolve an appreciable proportion of the polymeric alcohol are preferably avoided, since when such amounts are present it is difficult to effect complete etherification, a substantial proportion of the available hydroxyl groups ordinarily remaining unreacted. The amount of water in the reaction mixture preferably should not exceed more than about 50% by weight of the etherifiable polyhydric compounds initially present in the reaction mixture, the preferred amounts of water being from about 10% to about 30% by weight. If desired, however, the polymeric allyl-type alcohol may be reacted in aqueous solution.

The reaction may be carried out over a wide temperature range. In general, temperatures from about 50° C. to about 100° C. are preferred. At lower temperatures the reaction is ordinarily too slow to be practicable, whereas at higher temperatures decomposition with accompanying discoloration may occur.

The reaction may be carried out in a continuous or batchwise manner. Atmospheric pressures are ordinarily suitable, although in some cases superatmospheric or reduced pressures may be employed. If desired, the reaction mixture may be provided with a blanket of an oxygen-free fluid such as nitrogen or carbon dioxide.

The products of the reaction may be separated from the other ingredients of the reaction mixture and purified by any suitable known or special methods. The reaction mixture may be dissolved in a solvent liquid, the cyanoethyl ether then being thrown out of solution by the addition of a sufficient amount of a non-solvent for the ether. Those compounds in which only a relatively small proportion of the hydroxyl groups are etherified may be soluble in water and may be separated from aqueous solutions by the addition of a suitable organic solvent such as an alcohol, halogenated hydrocarbon or the like. The more completely etherified compounds which are insoluble in water may be thrown out of their solutions in organic solvents by the addition of water. The compounds may be dried by contact with an anhydrous substance such as anhydrous sodium sulfate, calcium chloride and the like, or by exposing the material to a rarified atmosphere. If desired, any other method of separation and purification such as fractional distillation, crystallization, etc., may be employed.

The beta-cyanoethyl ethers of the polymeric allyl-type alcohols are normally liquid compounds varying in color from water-white to light yellow, depending upon the method of their preparation, their purity, etc. The new polymeric ethers have in the molecule a plurality of groups having the formula

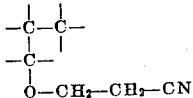

The beta-cyanoethyl ethers of polyallyl alcohol have in the molecule a plurality of groups having the formula

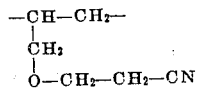

The new compounds are valuable as plasticizers and tackifiers for natural resins, protein plastics, cellulose derivatives, condensation-type synthetic resins such as the super-polyesters, polyamides, polyester-amides, phenol-aldehylde, urea-aldehyde, and alkyd resins. They may be used in conjunction with polymerization-type resins such as those which may be produced by the homopolymerization and copolymerization of unsaturated organic compounds. Among the elastomeric substances which may be modified by these new compounds are natural rubber and synthetic rubber, including polymers and copolymers of 1,3-butadiene, isoprene, 2,3-dimethyl-1,3-butadiene, 2-methyl-1,3-pentadiene, 4-methyl-1,3-pentadiene, chloroprene and the like.

The new compounds may be employed as textile assistants, as lubricants, as chemical intermediates, etc. Some or all of the cyano groups may be converted to carboxyl groups. The resulting carboxylic acids (beta-carboxyethyl ethers of polymeric allyl-type alcohols) may be employed as plasticizers, tackifiers and the like. Salts of the carboxylic acids may be employed in surface-active compositions. Some or all of the carboxyl groups of the acids may be esterified with saturated or unsaturated alcohols, the resulting esters being employed as softening agents in plastic compositions and in conjunction with elastomers.

Typical saturated esters of the beta-carboxyethyl ethers of the polymeric allyl-type alcohols are those in which the carboxyl groups are esterified with methyl, ethyl, propyl, isopropyl, butyl, isobutyl, n-amyl, etc., aliphatic alcohols, which may or may not contain aromatic or other substituents, or with phenols such as phenol, the cresols, the xylenols, the naphthols, etc. The carboxyl groups may be esterified with alcohols having other functional groups in the molecule, e. g. glycolic acid, lactic acid, etc., which other functional groups may be further reacted.

The carboxyl groups of the beta-carboxyethyl ethers may be esterified with unsaturated alcohols such as vinyl-type alcohols, e. g. vinyl alcohol, isopropenyl alcohol, etc.; propargyl-type alcohols, notably propargyl alcohol; and allyl-type alcohols such as those designated hereinbefore and others. These and other unsaturated esters may be polymerized by heating, preferably in the presence of catalysts, notably oxygen-containing catalysts such as peroxides, e. g. benzoyl peroxide, lauryl peroxide, tertiary butyl hydroperoxide, di(tertiary butyl) peroxide, etc. In most cases polymers may be produced which are infusible and substantially insoluble in common organic solvents. Some of the unsaturated esters may be employed as drying oils. The viscosity of such esters may be increased by bodying processes. Bodying may be effected by heating in the presence or absence of oxygen, temperatures of from about 100° F. to about 500° F. being usual. The esters may be bodied by an oxygen-containing gas. In many cases the esters may be infusibilized by prolonging the bodying treatment, or by the use of more vigorous conditions such as higher temperatures, more effective contact with oxygen, etc. Bodying, as well as subsequent infusibilization, may be promoted by the presence of driers such as red lead, litharge, manganese dioxide and fused driers such as the cobalt, lead, manganese, etc., resinates, linoleates, naphthenates and the like.

Polycarboxylic acids produced by converting some or all of the cyano groups of the beta-cyanoethyl ethers to carboxyl groups may be reacted with one or more polyhydric alcohols in the presence or absence of a drying oil or semi-drying oil to produce alkyd-type resins. Ester-forming derivatives such as esters, anhydrides, etc., of the acids may be employed in place of the free acids themselves. Polyhydric alcohols which may be employed in the production of these alkyd resins include ethylene glycol, diethylene glycol, glycerol, polyglycerols, pentaerythritol, polypentaerythritols, polyvinyl alcohols, polymeric allyl-type alcohols, etc.

The metal salts of the beta-carboxyethyl ethers of the polymeric allyl-type alcohols, particularly the alkali metal salts, are particularly useful for sizing or impregnating paper, whereby the wet-strength of the paper is improved.

The cyano compounds may be converted by hydrogenation or other suitable treatment to the polyamines which may then be resinified by reaction with formaldehyde or other aldehyde, preferably under alkaline conditions. Resins so produced may be employed alone or in conjunction with other resins as ion-exchange substances.

The beta-cyanoethyl ethers of the lower allyl-type alcohol polymers, particularly the dimers and trimers, may be converted to the corresponding carboxylic acid which may then be reacted with one or more diamines under super-polyamide-forming conditions to produce super-polyamides. The beta-cyanoethyl ethers of the dimers and trimers may be hydrogenated to the corresponding diamines and triamines which may then be reacted with dicarboxylic acid, yielding super-polyamides.

The following examples in which parts are on a weight basis are given for the purpose of illustrating some of the many ways in which the invention may be carried out.

Example I

Polyallyl alcohol having a polymerization degree of about 9 was produced by the polymerization of allyl acetate with 1% of tertiary butyl hydroperoxide at about 200° C. followed by the alcoholysis of the resulting polymeric ester with methyl alcohol in the presence of a small amount of sodium methylate. A mixture of polyallyl alcohol, 2 parts, acrylonitrile, 15 parts, and sodium hydroxide, 1 part (introduced as a 2% aqueous solution), was refluxed with vigorous stirring for 1½ hours, at the end of which time an additional part of sodium hydroxide (as a 2% solution) was introduced, followed by heating for an additional 2½ hours. The resulting mixture was poured into 50% aqueous ethyl alcohol. The beta-cyanoethyl ether of polyallyl alcohol was separated by the addition of water to this solution. The yellow liquid ether was dried over sodium sulfate and subjected to distillation under reduced pressure. The ether was soluble in ethyl alcohol, acetone and benzene but insoluble in water. It has an acetyl value of 0.055 equivalent per 100 g., indicating the etherification of 94% of the available alcoholic hydroxyl groups. Nitrogen content was 13.5%, as compared with a theoretical value of 12.8%, indicating the possible presence of a small amount of polymeric acrylonitrile.

Example II

The beta-cyanoethyl ether of polymeric methallyl alcohol is produced by the reaction of acrylonitrile upon polymeric methallyl alcohol in the presence of a small amount of dilute aqueous sodium hydroxide in accordance with the procedure outlined in Example I.

Example III

A mixture of the beta-cyanoethyl ether of polyallyl alcohol, 20 g., produced in accordance with Example I, and concentrated hydrochloric acid, 20 cc., was heated with steam. An immediate exothermic reaction ensued with the formation of a white precipitate (ammonium chloride). After ½ hour the mixture was subjected to gentle refluxing. The mixture was then diluted with water. An oily layer which separated was washed and dried in the usual manner. The product, consisting of the beta-carboxyethyl ether of polyallyl alcohol, was a reddish brown viscous liquid, very slightly soluble in water and soluble in aqueous sodium hydroxide.

Example IV

The beta-cyanoethyl ether of polyallyl alcohol, 20 g., produced in accordance with Example I, was dissolved in a mixture of sodium hydroxide, 11 g., water, 40 cc., and ethyl alcohol, 15 cc. The mixture was heated for about 8 hours under a reflux condenser. It was then poured into a large volume of water. The beta-carboxyethyl ether of polyallyl alcohol was precipitated therefrom by neutralizing with hydrochloric acid.

Example V

The cyanoethyl ether of polycrotyl alcohol is produced by the reaction of acrylonitrile upon polycrotyl alcohol in the presence of a small amount of dilute aqueous potassium hydroxide in accordance with the general procedure of Example I. Polycrotyl alcohol is produced by refluxing polycrotyl acetate or polycrotyl propionate with methyl alcohol in the presence of a very small amount of sodium methylate. Polycrotyl acetate and polycrotyl propionate are produced by heating the monomer at 200° C. in an atmosphere of oxygen-free nitrogen in the presence of 1% of tertiary butyl hydroperoxide.

Example VI

Polymeric beta-chloroallyl alcohol is produced by polymerizing beta-chloroallyl acetate in the presence of a peroxide and refluxing the polymeric ester with methyl alcohol containing a small amount of sodium methylate. The polymeric alcohol is reacted with acrylonitrile in accordance with the procedure described in Example I with the resulting production of a cyanoethyl ether of polychloroallyl alcohol.

Example VII

A mixture of the cyanoethyl ether of polyallyl alcohol produced in accordance with Example I, 50.3 parts, and concentrated hydrochloric acid, 64 parts, was heated in a glass reaction vessel under a condenser to 50° C. An exothermic reaction ensued, following which the mixture was heated just below reflux temperature for 2½ hours. The mixture was diluted with water, whereupon the beta-carboxyethyl ether of polyallyl alcohol separated from the remainder of the reaction mixture. The product was washed several times with water and purified by removal of the volatiles under reduced pressure. 57.3 parts of the dark red, viscous liquid product were obtained. The product had an acid number of 319 (mg. of KOH per g. of product) as opposed to a theoretical acid number of 384.

Example VIII

The beta-carboxyethyl ethers of polyallyl alcohol obtained in accordance with Example VII was esterified with allyl alcohol in accordance with the following procedure: the carboxyether, 55 parts, was mixed with allyl alcohol, 193.4 parts, benzene, 132 parts, and paratoluene sulfonic acid, 0.25 part. The mixture was refluxed for 5 hours with the continuous removal of water in an azeotropic mixture with benzene and allyl alcohol until the theoretical amount of water had been removed. The product was washed with alkali to destroy the acid catalyst, dried and distilled in the usual manner.

I claim as my invention:

1. The beta-cyanoethyl ether of polymer of a beta, gamma-monoolefinic monohydric alcohol, said ether being soluble in alcohols and hydrocarbons.
2. The beta-cyanoethyl ether of polymer of a beta, gamma-monoolefinic monohydric alcohol, said polymer having an average degree of polymerization of about 6 to 20 and said ether being soluble in alcohols and hydrocarbons.
3. The beta-cyanoethyl ether of polyallyl alcohol having an average degree of polymerization of about 6 to 20, said ether being soluble in alcohols and hydrocarbons.
4. The beta-cyanoethyl ether of polyallyl alcohol having an average degree of polymerization of about 6 to 12, said ether being soluble in alcohols and hydrocarbons.

RICHARD R. WHETSTONE.

REFERENCES CITED

The following references are of record in the file of this patent:

(Other references on following page)

UNITED STATES PATENTS

| Number | Name | Date |
|---|---|---|
| 2,316,128 | Bock et al. | Apr. 6, 1943 |
| 2,316,129 | Bock et al. | Apr. 6, 1943 |
| 2,318,959 | Muskat et al. | May 11, 1943 |
| 2,332,049 | Bock et al. | Oct. 19, 1943 |
| 2,332,460 | Muskat | Oct. 19, 1943 |
| 2,341,553 | Houtz | Feb. 15, 1944 |
| 2,375,847 | Houtz | May 15, 1945 |
| 2,379,250 | Muskat et al. | June 26, 1945 |

OTHER REFERENCES

Barron, "Modern Plastics," pages 74–76, published by Wiley, New York, 1945.

Schriner et al., "The Systematic Identification of Organic Compounds," pages 41 and 43, published by Wiley, New York, 1940.